United States Patent [19]

Gaignoux et al.

[11] Patent Number: 4,863,377
[45] Date of Patent: Sep. 5, 1989

[54] APPARATUS FOR THE HYDRAULIC CONVEYANCE OF SUBSTANCES AND USE THEREOF

[75] Inventors: Daniel Gaignoux, St. Maurice, France; Herbert Sievi, Kreuzlingen, Switzerland

[73] Assignee: Neuweiler AG, Kreuzlingen, Switzerland

[21] Appl. No.: 205,000

[22] Filed: Jun. 7, 1988

Related U.S. Application Data

[63] Continuation of Ser. No. 33,018, Mar. 31, 1987, abandoned.

[30] Foreign Application Priority Data

Apr. 8, 1986 [CH] Switzerland .......................... 1373/86

[51] Int. Cl.⁴ .............................. F27B 9/00; A23I 3/08
[52] U.S. Cl. .................................... 432/133; 432/152; 432/145; 99/483
[58] Field of Search ................... 432/133, 144, 152, 58; 99/483

[56] References Cited

U.S. PATENT DOCUMENTS

| | | | |
|---|---|---|---|
| 3,168,298 | 2/1965 | Cook et al. | 432/133 |
| 3,172,647 | 3/1965 | Remney | 432/133 |
| 3,584,569 | 6/1971 | Wieser et al. | 99/361 |
| 3,793,939 | 2/1974 | Wieser et al. | 99/483 |
| 3,801,267 | 4/1974 | Okuno et al. | 432/133 |
| 3,902,382 | 11/1975 | Hovis et al. | 432/133 |
| 4,073,226 | 2/1978 | Shulz | 99/427 |
| 4,249,895 | 2/1981 | Mantegani | 432/133 |
| 4,522,586 | 6/1985 | Price | 432/145 |
| 4,588,378 | 5/1986 | Yamamoto et al. | 432/152 |

FOREIGN PATENT DOCUMENTS

| | | |
|---|---|---|
| 190133 | 11/1907 | Fed. Rep. of Germany . |
| 2044802 | 2/1972 | Fed. Rep. of Germany . |
| 8105230 | 9/1982 | France . |
| 6911760 | 2/1970 | Netherlands . |
| 2100694 | 5/1985 | United Kingdom . |

Primary Examiner—Henry C. Yuen
Attorney, Agent, or Firm—Brown, Martin, Haller & McClain

[57] ABSTRACT

A conveyance channel (76) connects an inlet valve (74) to a free outlet (82) whereby the conveyance channel (76) first passes through a sterilization zone (78) and then through a cooling zone (80). Within the cooling zone (80), the conveyance conduit contains resistor areas (94, 96). This makes it possible to reduce the conveyance pressure in the conveyance channel (76) against the outlet (82) to such an extent that packings sterilized in the conveyance channel (76) are able to exit the outlet (82) virtually pressureless.

12 Claims, 2 Drawing Sheets

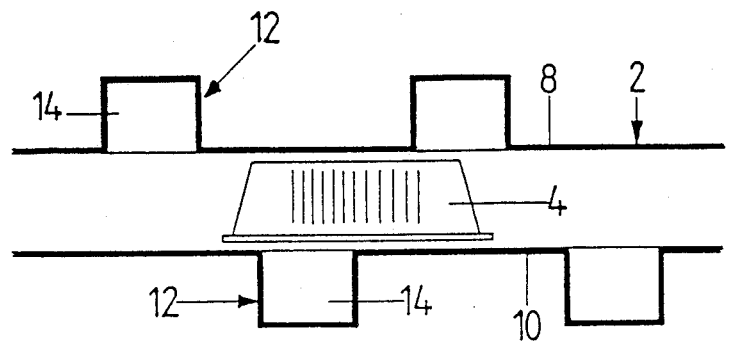
Fig.1
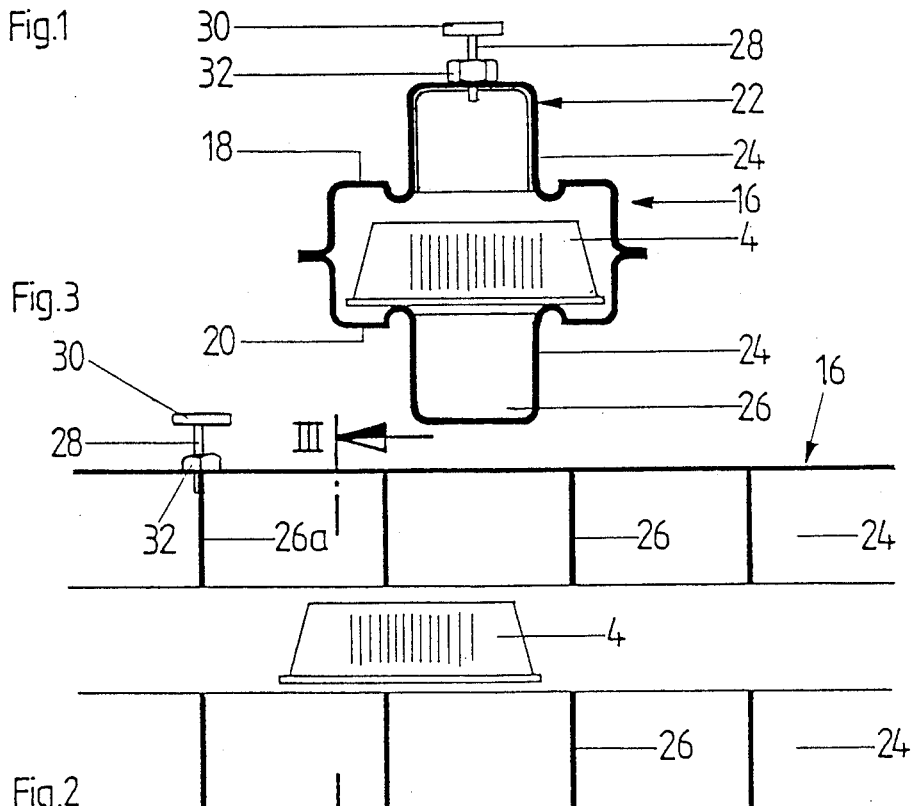
Fig.3
Fig.2
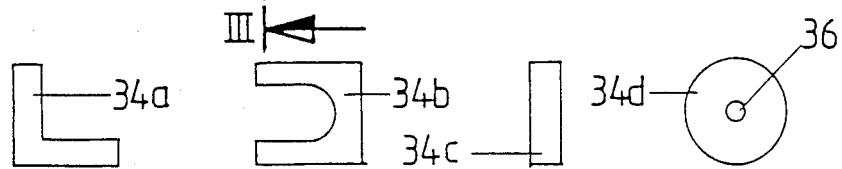
Fig.4     Fig.5     Fig.6     Fig.7

APPARATUS FOR THE HYDRAULIC CONVEYANCE OF SUBSTANCES AND USE THEREOF

This is a continuation of application Ser. No. 07/033,018, filed Mar. 31, 1987, abandoned.

BACKGROUND OF THE INVENTION

The present invention relates to an apparatus for conveying articles such as packages or containers filled with material, particularly packages filled with foodstuffs or other consumer products.

In U.S. Pat. No. 3,793,939 of Wieser et al. an installation for sterilization of such articles is described, in which packages are conveyed along a channel through a sterilization zone solely by means of a through-flowing fluid medium in the channel.

Depending upon the packing to be sterilized, a hydraulic pressure is required in the sterilization area which counters the inner pressure within the packing in order to prevent the packing from being destroyed. This over-pressure required by the liquid must be reduced within the cooling zone in the course of cooling until virtual ambient pressure exists at the outlet of the conveyance channel. The pressures brought to bear upon the packing are brought about on the one hand by the hydrodynamic pressure defined by the conveyance speed of the liquid flow; on the other by the hydrostatic pressure of the liquid column in the arrangement. In order to be able to build up and reduce the relatively high pressures in the sterilization and cooling range, it is necessary to arrange the conveyance channels within the cooling zone in a relatively high tower so that, when conveying the packing, the appropriate pressure reduction is achieved from bottom to top. Such high towers, however, have different disadvantages. On the one hand, such towers require very stable supporting structures, which render the arrangement costly and unpractical. On the other, such towers require a significant expense of insulation when freezing of the liquid column should be countered in the cold season; in particular, when the installation is to be shut down outside working hours. Finally, such arrangements do not allow for control of the pressure curve in the conveyance channel since it is determined almost exclusively by the hydrostatic liquid column.

SUMMARY OF THE INVENTION

The purpose of the present invention is to improve the apparatus of the kind described earlier so that the disadvantages described above can be avoided.

According to the present invention, an apparatus for hydraulic conveyance of articles is provided which comprises a channel having an inlet end and an outlet end in which articles are conveyed along the channel solely by a through-flowing liquid, and flow resistors are provided in resistor areas in the channel for reducing the pressure of the liquid. This apparatus makes it possible to reduce the pressure in a simple manner in a conveyance channel so that a substance may exit the conveyance channel virtually pressureless even if, for example, conveyance occurs from top to bottom.

The flow resistors may comprise outwardly directed pockets in the channel for reducing the liquid pressure at that point. These may be provided on opposite sides of the channel at spaced intervals in one or more resistor zones, at least one of which is preferably located at or close to the channel outlet. Alternatively, the channel may comprise a main conduit for transporting articles and an auxiliary conduit extending alongside the main conduit at least in one or more resistor zones of the channel. The auxiliary conduit is in liquid communication with the main conduit and contains spaced resistor elements for at least partially blocking flow along the auxiliary conduit. Auxiliary conduits containing flow resistors may be provided along opposite sides of the channel in one or more resistor zones. This increases the resistance values. The resistor elements may comprise lamellae of various shapes which are adjustable in position in the or each auxiliary channel, providing more precise control of the resistance value. The lamellae may be swingable or retractable, either by manual or motor driven adjustment devices, to allow continuous readjustment if desired.

In another alternative, the channel may comprise inner and outer concentric conduits, with the articles being conveyed along the inner conduit and the inner conduit having openings communicating with the space between the inner and outer conduits. This space may contain flow resisting elements. This arrangement will also provide a resistance zone.

A preferred embodiment is an arrangement of the apparatus in accordance with Claim 9 whereby a secondary liquid cycle enables further control of the pressure in the apparatus. The secondary liquid flow can be directly superimposed on the first liquid flow, for example in the arrangement comprising inner and outer conduits in fluid communication, the secondary liquid flow may be connected to the space in the outer conduit surrounding the inner conduit.

In the preferred embodiment of the invention, the apparatus is designed for conveying articles comprising packages filled with materials such as foodstuffs or other consumer items, and suitably includes an arrangement for heat treatment of the contents of the packages. The arrangement preferably includes a heating or sterilization zone as well as a cooling zone. Heat treatment is to be understood in its most general form and incorporates cooling as well as heating.

Inasmuch as the conveyance channel contains flow resistors for reducing the pressure of the liquid, it is possible to replace the pressure determined so far by the hydrostatic column with a hydrodynamic pressure of the conveyance liquid, which can be reduced in those areas of the conveyance channel in which the flow resistors are arranged. This measure makes it possible to eliminate high towers and to build compact, relatively low installations. This also makes it possible to simplify the expense of supporting frames and to solve the problems of insulation with simpler means. In addition, such an arrangement offers the distinct advantage that the pressure in the system can be regulated by the flow pressure of the conveying liquid, thus making it possible to simplify the system and to adapt it to changing packing properties and changing heat treatment conditions.

BRIEF DESCRIPTION OF THE DRAWINGS

Variant embodiments of the invention may be better understood from the following description, with reference to the accompanying drawings, in which:

FIG. 1 is a sectional view of a conveyance channel with flow resistors designed as pockets;

FIG. 2 is a section view of a conveyance channel with two secondary channels in which resistor elements are arranged;

FIG. 3 is a transverse section of the conveyance channel of FIG. 2 on the line III—III of FIG. 2;

FIGS. 4 to 7 illustrate various resistor elements in a view transverse to the direction of flow;

DESCRIPTION OF THE PREFERRED EMBODIMENT

Figure 8:
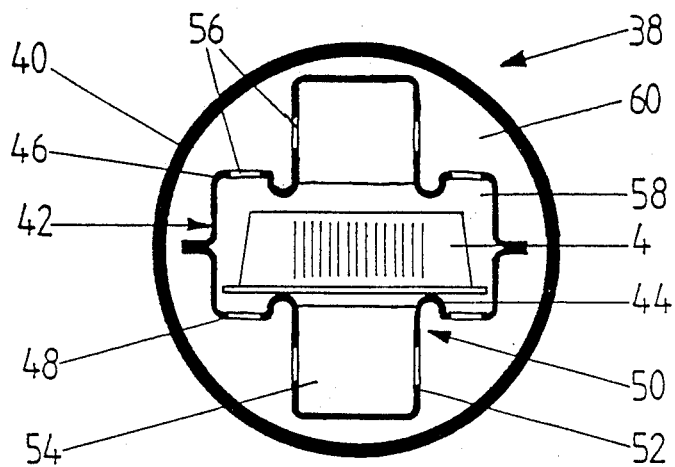
FIG. 8 is a sectional view of a conveyance channel and one guide channel with two secondary channels.

FIG. 1 of the drawings illustrates part of a package conveying channel 2 according to a first embodiment of the invention. Packages 4 are conveyed along the channel between an inlet and an outlet solely by means of a through-flowing liquid supplied to the channel. The channel contains a series of flow resistors along opposite sides 8 and 10, which may be arranged in certain resistance zones as explained below in connection with FIG. 10. In the embodiment shown in FIG. 1, the flow resistors comprise pockets 12 which point outwardly from the channel to reduce the liquid pressure at that point.

FIGS. 2 and 3 show a further conveyance channel 16 containing secondary channels 24 acting as flow resistors 22 on opposite sides 18, 20. In these secondary channels are arranged resistor elements 26 across the direction of flow. These resistor elements 26 can be built in fixed in the secondary channel 24 or can be positioned into it, as shown for resistor element 26a. To this effect, the positionable resistor element 26a features an axle 28 to which is affixed a handle 30. A set screw 32 secures the selected setting of the resistor element 26. Adjustability can also be achieved through drive-out or drive-in resistor elements. Particularly advantageous is an arrangement in which setting by hand or motor is readily available, thus resulting in continuous pressure control.

FIGS. 4 to 7 show various resistor elements across the direction of flow. The resistor element 34a of FIG. 4 is arranged in the shape of an L. The resistor element 34b of FIG. 5 is U-shaped. The resistor element 34c of FIG. 6 is beam-shaped. The resistor element 34d of FIG. 7 has the form of a circular disk with a central through bore 36. Many other forms of resistor elements are possible.

Figure 9:
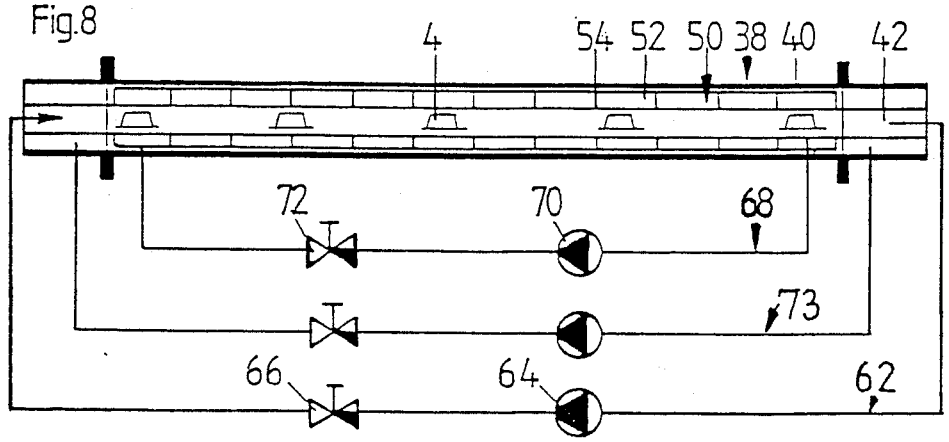
FIG. 9 is a longitudinal section of the conveyance channel of FIG. 8 with three connected liquid cycles.

FIGS. 8 and 9 show a variant conveyance channel 38 consisting of a cylindrical casing 40 containing a guide channel 42 for packings 4. The guide channel 42 contains cam grooves 44 in order to minimize the conveyance resistance exerted by packing 4. Like the variant embodiments of FIGS. 2 and 3, the guide channel 42 features flow resistors 50 on opposite sides 46, 48 arranged in the form of secondary channels 52 with resistor elements 54. The guide channel 42 contains openings 56 through which the interior 58 of the guide channel 42 communicates with the space 60 between the guide channel 42 and the casing 40. The space 60 can also or even exclusively contain resistor elements not illustrated here.

As shown in FIG. 9, in particular, the conveyance channel 38 is connected to a first liquid cycle 62 which feeds a liquid flow upstream into the guide channel 42 and which drains downstream. The liquid cycle 62 contains a pump 64 and a control valve 66 with which the flow amount of the liquid can be controlled. A second liquid cycle 68 can also empty into the guide channel 42 or be connected to the casing 40 and empty into the space 60 between the casing 40 and the guide channel 42. This liquid cycle also contains a pump 70 and a control valve 72 in order to regulate the liquid flow and, as a result, the flow resistance. While the first liquid cycle 62 is used primarily to convey the packings 4 in the guide channel 42, the second liquid cycle 68 controls the pressure reduction by changing the quantity of the liquid. Both liquid cycles can affect the flow resistance separately or jointly, which counters the conveyance pressure of the liquid flow. A third liquid cycle 73 is shown which also contains a pump and control valve. This cycle preferably includes a heat exchanger (not shown) for heating or cooling the liquid passing along cycle 73. This allows the conveying liquid itself to be used as a heat transfer medium for either heating or cooling the contents of packings 4.

Using resistor elements arranged at distances of 0.2 to 0.4 m, a pressure reduction $\Delta p = 0.02$ to 0.2 bar per meter can be achieved, for example, at a liquid velocity of 50 to 150 m per minute.

Figure 10:
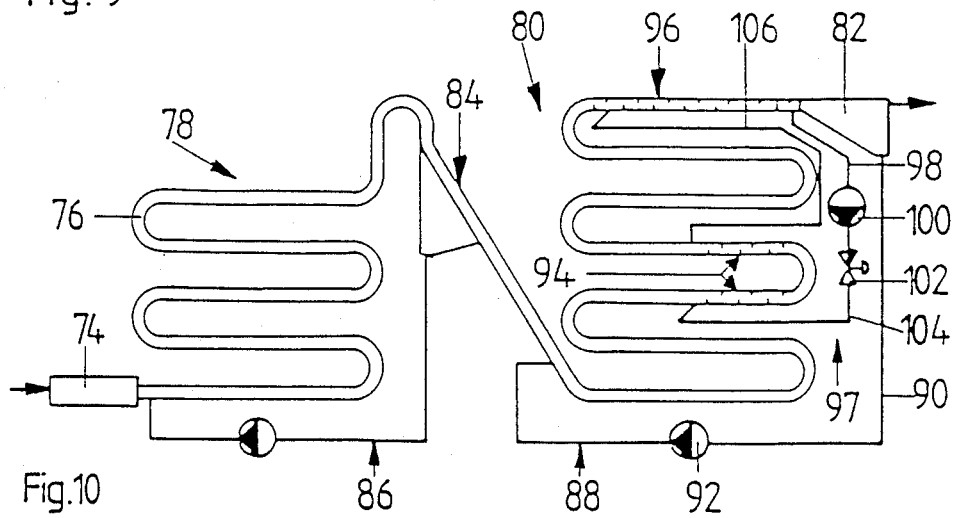
FIG. 10 is a schematic illustration of the entire system.

FIG. 10 is a schematic view of the entire installation. At an inlet valve 74, packings are fed into a conveyance channel 76, which conveys the packings to a free discharge 82 on the one hand through a sterilization zone 78 and on the other through a cooling zone 80. Between the sterilization zone 78 and the cooling zone 80 is a valve 84 which by way of example, can be of the type as described in U.S. Pat. No. 3,793,939 referred to above. Through the valve 84, both the sterilization zone 78 and the cooling zone 80 contain their own liquid cycles 86, 88. The liquid cycle 88 of the cooling zone 80 corresponds with the first liquid cycle 62 as described in FIG. 9, which reintroduces the conveyance or cooling liquid collected at the outlet 82 such as water to the conveyance channel 76 at the beginning of the cooling zone 80 via a conduit 90 and a pump 92. The cooling liquid may be cooled using a cooling unit not further described here.

The cooling area 80 contains resistor zones 94, 96 as illustrated in FIG. 9 connected to a second liquid cycle 97, corresponding to the second liquid cycle 68 of FIG. 9. At the end of the resistor zone 96, the liquid of the second liquid cycle 97 is drained with a pump 100 via a conduit 98 and is fed into the first resistor area 94 via a control valve 102 and the conduit 104. At the end of the first resistor area 94, the liquid is drawn via a connecting conduit 106 and reintroduced at the beginning of the resistor zone 96.

While a preferred embodiment of the invention has been described in detail by way of example, it will be understood that the invention is not limited to changes and the described embodiment and that various modifications may be made thereto without departing from the nature and spirit of the invention, which is defined by the appended claims.

What is claimed is:

1. Apparatus for the hydraulic conveyance of articles, comprising:

a conveying channel having an inlet at one end for entry of articles into the channel and an outlet at the other end for exit of articles of the channel;

liquid supply means for supplying through flowing liquid to said channel to transport articles through the channel to the outlet;

the conveying channel comprising a guide conduit for guiding articles along the channel and at least one secondary conduit extending along at least part of the length of the guide conduit and in fluid communication with the guide conduit, the secondary conduit containing resistor elements for at least partially blocking liquid flow along said secondary conduit.

2. An apparatus for the hydraulic conveyance of articles, comprising:
a conveying channel having an inlet at one end for entry of articles into the channel and an outlet at the other end for exit of articles out of the channel;
liquid supply means for supplying through flowing liquid to said channel to transport articles through the channel to the outlet;
the channel having enlarged portions of increased volume along at least part of its length, the enlarged portions containing flow resisting elements for partially blocking liquid flow.

3. The apparatus as claimed in claim 2, wherein the enlarged portions comprises spaced, outwardly directed pockets in said channel for expanding the volume of said channel.

4. The apparatus as claimed in claim 2, in which the conveying channel comprises a main conduit for transporting articles and at least one secondary conduit extending alongside the main conduit and in liquid communication with the main conduit, and a series of flow resisting elements are provided along said secondary conduit for at least partially blocking liquid flow along said secondary conduit.

5. The apparatus as claimed in claim 4, wherein the resistor elements are adjustable relative to the flow direction.

6. The apparatus as claimed in claim 4, wherein the resistor elements comprise lamellae.

7. The apparatus as claimed in claim 2, in which the conveying channel comprises a main conduit with secondary conduits extending along opposite sides of the main conduit and a series of resistor elements are provided in the secondary conduits for at least partially blocking flow along said conduits.

8. The apparatus as claimed in claim 2, in which the conveying channel comprises an inner channel along which articles are transported, and an outer conduit surrounding the inner channel, the inner channel having openings for communicating with the outer conduit.

9. The apparatus as claimed in claim 2, including adjustable secondary liquid supply means for supplying a secondary flow of liquid to said conveying channel.

10. The apparatus as claimed in claim 9, in which said secondary liquid flow is supplied to at least said enlarged portions.

11. The apparatus as claimed in claim 9, in which the conveying channel comprises an inner conduit along which articles are conveyed and an outer conduit surrounding the inner conduit, the inner conduit having openings for liquid communication between the inner and outer conduits, and the secondary liquid flow is supplied to the space in said outer conduit surrounding the inner conduit.

12. The apparatus as claimed in claim 2, further including sterilization means for the sterilizing of articles comprising packages filled with material.

* * * * *